United States Patent
Allmendinger et al.

(10) Patent No.: US 10,010,802 B2
(45) Date of Patent: Jul. 3, 2018

(54) HYBRID BRAKE SYSTEM FOR A MODEL VEHICLE

(71) Applicant: TRAXXAS LP, Plano, TX (US)

(72) Inventors: Otto Karl Allmendinger, Rowlett, TX (US); Adam Cole Ewing, McKinney, TX (US); Jonathan Scott Wood, Plano, TX (US); Brent Whitfield Byers, Plano, TX (US)

(73) Assignee: Traxxas, LP, McKinney, TX (US)

( * ) Notice: Subject to any disclaimer, the term of this patent is extended or adjusted under 35 U.S.C. 154(b) by 999 days.

(21) Appl. No.: 14/187,111

(22) Filed: Feb. 21, 2014

(65) Prior Publication Data
US 2014/0235137 A1   Aug. 21, 2014

Related U.S. Application Data

(60) Provisional application No. 61/767,755, filed on Feb. 21, 2013.

(51) Int. Cl.
| | | |
|---|---|---|
| A63H 30/04 | (2006.01) | |
| A63H 17/42 | (2006.01) | |
| B60T 7/16 | (2006.01) | |
| B60T 13/74 | (2006.01) | |

(52) U.S. Cl.
CPC ............ *A63H 30/04* (2013.01); *A63H 17/42* (2013.01); *B60T 7/16* (2013.01); *B60T 13/74* (2013.01)

(58) Field of Classification Search
CPC . A63H 17/42; B60T 7/16; B60T 13/74; F16D 55/08
See application file for complete search history.

(56) References Cited

U.S. PATENT DOCUMENTS

| | | | | |
|---|---|---|---|---|
| 5,338,247 | A * | 8/1994 | Miles | A63H 17/262 180/56 |
| 5,511,859 | A | 4/1996 | Kade et al. | |
| 6,231,422 | B1 * | 5/2001 | Choi | A63H 17/40 446/441 |
| 6,565,409 | B1 | 5/2003 | Isogai | |
| 7,335,084 | B2 * | 2/2008 | Sato | A63H 17/262 446/465 |
| 7,900,753 | B2 * | 3/2011 | Chang | A63H 17/42 188/106 P |

(Continued)

FOREIGN PATENT DOCUMENTS

| | | |
|---|---|---|
| CN | 1433827 A | 8/2003 |
| CN | 101468259 A | 7/2009 |

(Continued)

OTHER PUBLICATIONS

PCT/US2014/017827; International Search Report and Written Opinion; dated Jul. 23, 2014.

(Continued)

*Primary Examiner* — Jay Liddle
*Assistant Examiner* — Alex F. R. P. Rada, II
(74) *Attorney, Agent, or Firm* — Daryl R. Wright; Greg Carr (57) ABSTRACT

The present invention provides a model vehicle having a motor and electronic speed control for driving and braking driven wheels, combined with a separate braking system for non-driven wheels. A controller and a method of operation are provided.

25 Claims, 5 Drawing Sheets

(56) References Cited

U.S. PATENT DOCUMENTS

| | | | | |
|---|---|---|---|---|
| 7,938,709 B2* | 5/2011 | Leonov | ............... | A63H 17/36 446/129 |
| 2007/0000739 A1 | 1/2007 | Lamarr | | |
| 2007/0012527 A1* | 1/2007 | Wu | ............... | A63H 17/42 188/71.5 |
| 2008/0303227 A1* | 12/2008 | Chi Chun Idiot | ... | A63H 17/262 280/1 |
| 2009/0033143 A1* | 2/2009 | Chang | ............... | A63H 17/42 303/20 |
| 2009/0160375 A1 | 6/2009 | Katsuyama | | |
| 2010/0041309 A1* | 2/2010 | Cipriani | ............... | A63H 17/262 446/456 |
| 2013/0244536 A1* | 9/2013 | Chan | ............... | A63H 17/395 446/454 |

FOREIGN PATENT DOCUMENTS

| | | |
|---|---|---|
| CN | 102125763 A | 7/2011 |
| DE | 20 2007 011787 U1 | 1/2008 |
| EP | 2345469 A1 | 7/2011 |
| JP | 2006314463 A | 11/2006 |
| TW | 585134 A | 4/2004 |

OTHER PUBLICATIONS

Futaba/Hobbico; "Futaba 4PK-2.4GHz System Manual"; Futaba/Hobbico, Apr. 2008; http://manuals.hobbico.com/fut/4pk-2_4ghz-manual.pdf.

Gunn, Matt: "RCU Review: Futaba 4PK 2.4GHz Surface transmitter and R604FS receiver"; RC Universe.com, Dec. 16, 2008; http://www.rcuniverse.com/magazine/article_display.cfm?article_id=1049.

Hobbico; "Duratrax DXR500 Front Disk Brake" installation manual; Jan. 2011; http://manuals.hobbico.com/dtx/dtxc4756-manual.pdf.

Hobbico; "Duratrax DXR500" fact sheet, User Manual and Parts Guide; Jan. 2011; http://manuals.hobbico.com/dtx/dtxc4756-manual.pdf.

Tower Hobbies; "Duratrax 1/5 DXR500 Brushless On-Road Motorcycle 2.4GHz RTR Blue" web page; Apr. 19, 2011; http://www3.towerhobbies.com/cgi-bin/wti0001p?&I=LXAETZ**&P=ML.

Grimreminder; "HPI Baja Flux 5B Thread" message board post; R/C Tech Forums, Feb. 4, 2012; http://www.rctech.net/forum/oval-larger-scales-more/595435-hpi-baja-5b-flux-thread.html.

Mohr, Tim; "FID Racing 4 Wheel Hydraulic Brake for BAJA 5B/5T/5SC"; BigSquidRC.com, Jan. 8, 2013; http://www.bigsquidrc.com/fid-racing-4-wheel-hydraulic-brakes-for-baja-5b5t5sc/.

RC Man; "Castle Creations-Edge" message board post; RC Groups; Jan. 20, 2013; http://www.rcgroups.com/forums/showthread.php?t=1813321.

Castle Creations; "Phoenix Edge Users Guide"; Mar. 2013; http://www.castlecreations.com/support/documents/edge_guide.pdf Castle Creations; "Phoenix Edge Quick Start Guide"; Mar. 2013; http://www.castlecreations.com/support/documents/edge_qsg.pdf.

Tower Hobbies; "Duratrax 1/5 DXR500 Brushless On-Road 2.4GHz RTR" web page; Apr. 19, 2011; http://www3.towerhobbies.com/cgi-bin/wti0001p?&I=LXAETZ**&P=ML.

Inertia Racing Products; "FID 4 Wheel Hydraulic Disc Brakes for HPI Review" message board post, HPI Baja Forum; Sep. 11, 2013.

FG-Onlineshop.DE; "Item Detail" scale model cars with installed front brakes; Feb. 19, 2014; https://www.fg-onlineshop.de/ItemDetail.aspx?ig3=Race+Truck+1%3a6%2c+2WD&ig2=Super+Race+Truck+2WD-530&ig1=Chassis&desc1=Sportsline+2WD-530+FG+Super+Race+Truck%2cRTR%2cclear&ig3id=7&ig2id=125&ig1id=3&iid=5697&mi=0&hasv=0&webi=0&pr=0.

Hobby Fever; "DuraTrax Disc Brake Conversion Set Front DXR500" wen page; Jun. 15, 2014; http://www.hobbyfever.com/shop/product_info.php?products_id=11631&osCsid=brk53u24ps9hth1foc9qdkj306.

Unknown, Search Report; TW Patent Application No. 103105839, dated Jul. 26, 2017.

* cited by examiner

HYBRID BRAKE SYSTEM FOR A MODEL VEHICLE

CROSS-REFERENCE TO RELATED APPLICATIONS

This application relates to, and claims the benefit of the filing date of, U.S. provisional patent application Ser. No. 61/767,755 entitled HYBRID BRAKE SYSTEM FOR A MODEL VEHICLE, filed Feb. 21, 2013, the entire contents of which are incorporated herein by reference for all purposes.

TECHNICAL FIELD

This application relates to model vehicles and, more particularly, to braking systems for model vehicles.

BACKGROUND

In conventional two-wheel drive electric model vehicles, the vehicle is braked exclusively by the driven wheels. By short-circuiting its motor windings, the primary electric motor brakes the driven wheels through the drivetrain. The two driven wheels are usually the rear wheels in order to provide optimum driving traction when the vehicle accelerates forward.

However, braking a forward-moving vehicle with only the rear wheels causes increased forward weight transfer, a shifting of the vehicle's weight to the front tires. This forward weight transfer limits the maximum deceleration which braking the rear wheels can provide. If too much braking force is applied to the rear wheels, the vehicle's rear tires may begin to slide, causing a loss of control of the vehicle. Consequently, a conventional two-wheel drive electric model vehicle may only apply very little brake force if the driver is to maintain control of the vehicle.

Thus, the braking capabilities of conventional two-wheel drive electric model vehicles are limited. Because electric motor brakes are applied through the drivetrain, it is infeasible to simply add the braking system used for the drive wheels to the non-drive wheels. Such an addition would effectively introduce the same expense and other considerations as producing a four-wheel drive vehicle. It would be desirable if a braking system permitted the application of greater braking force without an accompanying loss of control.

Additionally, a conventional radio transmit controller only provides two channels of information to the model vehicle receiver: the position of the throttle trigger and the position of the steering wheel. The position of the throttle trigger controls three operations: forward acceleration, reverse acceleration, and braking. However, a conventional throttle trigger can be moved in only two directions: pulling the throttle trigger toward the user and pushing the throttle trigger away from the user.

Typically, the model vehicle's Electronic Speed Control (ESC) uses the speed and direction of the vehicle motor to determine if the throttle trigger controls forward and reverse acceleration, forward acceleration and braking, or reverse acceleration and braking. When the vehicle motor speed is at or below a speed threshold, the ESC permits the user to select between forward and reverse acceleration. Forward acceleration is performed by pulling the throttle trigger from a neutral position toward the user and reverse acceleration is performed by pushing the throttle trigger from the neutral position away from the user. When the motor is moving at above the speed threshold, the ESC permits the user to select between further acceleration in the same direction and braking. Further acceleration is performed by continuing to pull or push the throttle trigger, depending on which direction the vehicle motor is moving. Braking is performed by moving the throttle trigger to the opposite position, a position which would have caused acceleration in the other direction if the motor speed were at or below the speed threshold.

A disadvantage of this approach is that the trigger position used to brake varies depending on the direction the vehicle is currently accelerating. An alternative approach is a "one direction only" mode for the ESC. The one direction only mode may also be called a "forward only" mode when it permits acceleration in the forward direction, and may also be called a "reverse only mode" when it permits acceleration in the reverse direction.

When set to a one direction only mode, the ESC may consistently interpret all pulling on the throttle trigger from the neutral position as an instruction to accelerate the electric motor in a particular direction. The ESC may consistently interpret all pushing on the throttle trigger from the neutral position as an instruction to brake the electric motor. In both cases, the magnitude of the acceleration or braking force typically increases with the distance from the neutral position. A one direction only mode may permit consistent throttle positions to accelerate or brake the vehicle, but has the disadvantage of only permitting the vehicle to move in one direction.

It would be desirable if a transmit controller could permit the same positions of a throttle trigger to consistently accelerate and brake a model vehicle, regardless of the speed and direction of the vehicle motor, while still permitting both forward and reverse acceleration.

It would further be desirable if both the desired enhanced braking and transmit controller features described above could be implemented in an existing model vehicle, with a minimum of replacement of conventional vehicle components.

SUMMARY OF THE INVENTION

The present invention provides a model vehicle having a motor and electronic speed control for driving and braking driven wheels, combined with a separate braking system for non-driven wheels. A controller and a method of operation are provided.

BRIEF DESCRIPTION OF THE DRAWINGS

For a more complete understanding of the present invention and the advantages thereof, reference is now made to the following Detailed Description taken in conjunction with the accompanying drawing, in which.

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Figure 1:
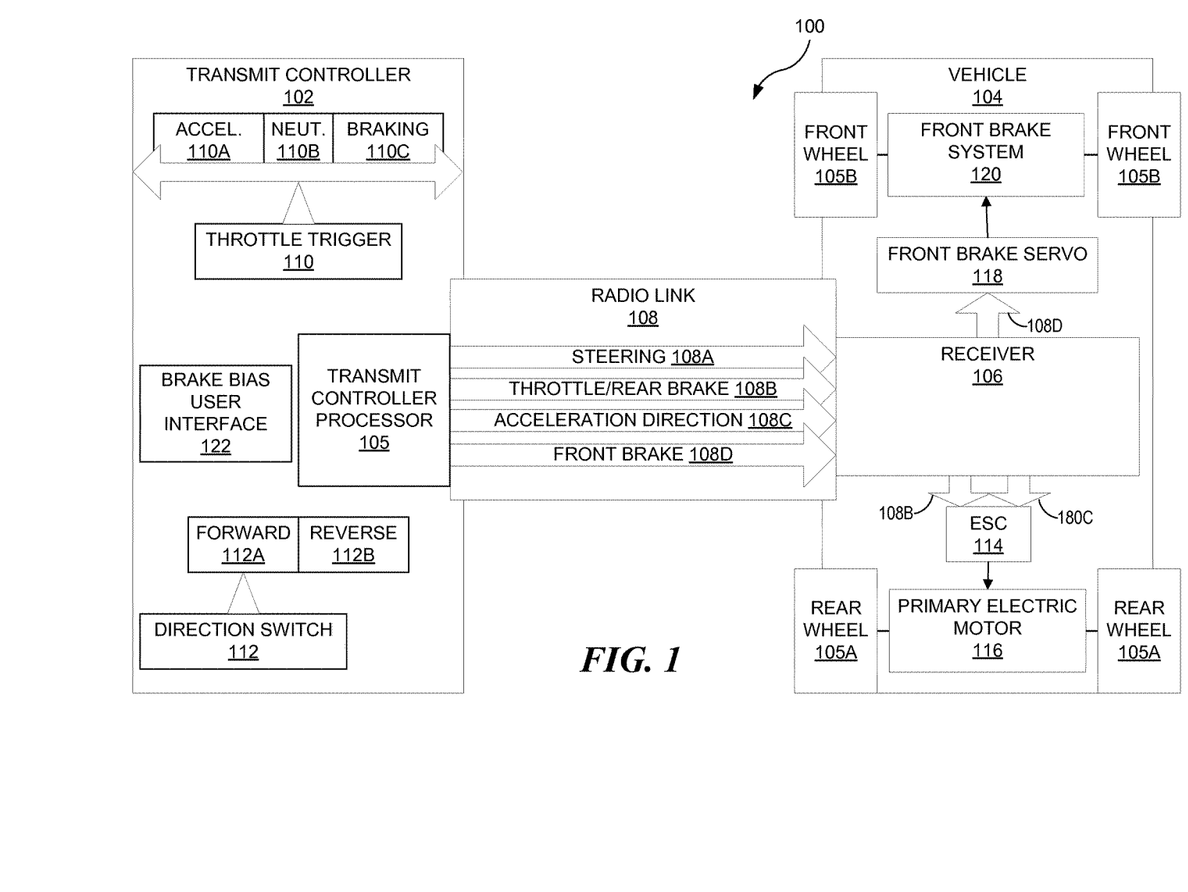
FIG. 1 depicts a model vehicle and transmit controller in accordance with an exemplary embodiment of the present invention.

With reference to FIG. 1, depicted is an exemplary combination 100 of a transmit controller 102 and a model vehicle 104. Transmit controller processor 105 on transmit controller 102 may communicate with receiver 106 on model vehicle 104 through radio link 108. Radio link 108 may be bidirectional and transmit controller 102 and receiver 106 may be transceivers, each capable of both transmitting and receiving radio signals through radio link 108. By convention, however, transmit controller 102 may be called a "transmitter" and receiver 106 may be called a "receiver."

Transmit controller 102 may have throttle trigger 110, which may have a range of movement from acceleration range 110A to neutral range 110B to braking range 110C. Acceleration range 110A may be a range of positions nearer to a user holding transmit controller 102, braking range 110C may be a range of positions farther from a user holding transmit controller 102, and neutral range 110B may be a middle range of positions between acceleration range 110A and braking range 110C.

Transmit controller 102 may also have direction switch 112. Direction switch 112 may allow the user to switch between forward and reverse acceleration for model vehicle 104. Direction switch 112 may have two positions, forward position 112A and reverse position 112B. When direction switch 112 is in forward position 112A, placing throttle trigger 110 in acceleration range 110A causes transmit controller processor 105 to instruct vehicle 104 to accelerate forward. Similarly, when direction switch 112 is in reverse position 112B, placing throttle trigger 110 in acceleration range 110A causes transmit controller processor 105 to instruct vehicle 104 to accelerate in reverse.

Model vehicle 104 may be a four-wheeled rear-wheel drive electric model vehicle. Model vehicle 104 may have two rear wheels 105A and two front wheels 105B. Model vehicle 104 may have receiver 106, ESC 114, and primary electric motor 116. ESC 114 may be a conventional ESC in one direction only mode. However, the direction ESC 114 accelerates the vehicle in is dependent on information received from receiver 106, as will be discussed further. Primary electric motor 116 may drive and brake rear wheels 105A conventionally as instructed by ESC 114.

Model vehicle 104 may also have front brake servo 118 and front brake system 120. When instructed to by receiver 106, front brake servo 118 may brake front wheels 105B using front brake system 120. Front brake system 120 may include mechanical or hydraulic brakes. Front brake system 120 preferably does not include an electric motor brake, as including an electric motor brake would defeat many of the reasons to create a two-wheel drive electric model vehicle.

Instead of the conventional two channels of information, transmit controller processor 104 may provide four channels of information to receiver 106 through radio link 108. Some existing receivers may be capable of receiving more than two channels of information, so existing receivers may be configured to utilize the four channels of information.

The four channels may include steering channel 108A, throttle/rear brake channel 108B, acceleration direction channel 108C, and front brake channel 108D. Steering channel 108A may control the steering servos of model vehicle 104 as is known in the art, and need not be discussed further.

Receiver 106 may provide information from throttle/rear brake channel 108B and acceleration direction channel 108C to ESC 114. Throttle/rear brake channel 108B may specify either an amount of acceleration or an amount of braking to apply to rear wheels 105A. Acceleration direction channel 108C may specify the direction for ESC 114 to accelerate the electric motor in. ESC 114 may use acceleration direction channel 108C to determine a direction for its one direction mode, and may use information from throttle/rear brake channel 108B to determine whether to accelerate or brake primary electric motor 116.

ESC 114 using the speed and direction of primary electric motor 116 to determine whether to accelerate or brake is unnecessary. Acceleration direction channel 108C alone may specify whether acceleration should be in the forward or reverse direction. Throttle/rear brake channel 108B alone may specify an amount of acceleration or braking.

Receiver 106 may provide information from front brake channel 108D to front brake servo 118. Front brake channel 108D may specify how much braking force should be applied to front wheels 105B, and front brake servo 118 may actuate front brake system 120 accordingly.

The user may select a brake bias, a ratio identifying an allocation of braking force between front brake system 120 and the rear brakes. For example, a brake bias of 70% front and 30% rear means 70% of the braking force specified by throttle trigger 110 will be applied by front brake system 120 and 30% of the braking force will be applied by the rear brakes.

The brake bias may be selected using brake bias user interface 122. The brake bias may be classified as a vehicle operational parameter and brake bias user interface 122 may be a user interface also used for other vehicle operational parameters. Brake bias user interface 122 may be a user interface built into the transmit controller, such as a dial or knob. Alternately, brake bias user interface 122 may be an auxiliary user interface device described in published patent application Ser. No. 12/850,453.

Transmit controller processor 105 may translate the position of throttle trigger 110 and the brake bias into information sent through throttle/rear brake channel 108B and front brake channel 108D. When throttle trigger 110 is pushed away from the user, an amount of braking force is specified by the distance of throttle trigger 110 from neutral range 110B. Using this specified amount of braking and the brake bias, transmit controller processor 105 may calculate an amount of rear braking force and an amount of front braking force. The amount of rear braking force may then be provided to ESC 114 through throttle/rear brake channel 108B, and the amount of front braking force may be provided to front brake servo 118 through front brake channel 108D.

When throttle trigger 110 is pulled toward the user, an amount of acceleration is specified by the distance of throttle trigger 110 from neutral range 110B. During acceleration, front brake channel 108D may be unnecessary. Transmit controller processor 105 may simply provide the amount of acceleration to ESC 114 through throttle/rear brake channel 108B.

When model vehicle 104 brakes while moving forward, its weight is transferred towards the front tires. Therefore, for forwards movement the brake bias should preferably be toward the front brakes. However, when model vehicle 104 brakes while moving in reverse, its weight is transferred towards the rear tires, so the brake bias should preferably be toward the rear brakes. In an embodiment, when the direction of acceleration is changed by direction switch 112, transmit controller processor 105 may automatically reverse the brake bias. A brake bias of 70% front and 30% rear may become a brake bias of 30% front and 70% rear, and vice versa. Model vehicle 104 may thereby retain approximately the same braking behavior regardless of whether it is driven forwards or in reverse.

Alternately, rather than reversing the brake bias, transmit controller processor 105 may set the brake bias to a predetermined amount which favors or strongly favors the wheels in the direction the vehicle is moving. A brake bias favoring the front wheels would be used for forward movement, and a brake bias favoring the rear wheels would be used for reverse movement.

While the above discussion was with reference to a rear-wheel drive electric model vehicle, it may also be applied to a front-wheel drive electric model vehicle. For a front-wheel drive electric model vehicle, brake servo 118 and brake system 120 may be placed on rear non-drive wheels 105A. The electric motor brake would then be for front drive wheels 105B and brake servo 118 would control the rear wheel brake system 120.

In a front-wheel drive electric model vehicle, the above front brake servo 118 may be configured as and function as a rear brake servo 118, and the above front brake system 120 may be configured as and function as a rear brake system 120. The above throttle/rear brake channel 108B may be configured as and function as a throttle/front brake channel 108B. The above front brake channel 108D may be configured as and function as a rear brake channel 108D.

In more general terms, the above front brake servo 118 may be configured as and function as a non-drive wheel brake servo 118, and the above front brake system 120 may be configured as and function as a non-drive wheel brake system 120. The above throttle/rear brake channel 108B may be configured as and function as a throttle/drive wheel brake channel 108B. The above front brake channel 108D may be configured as and function as a non-drive wheel brake channel 108D.

Figure 2A:
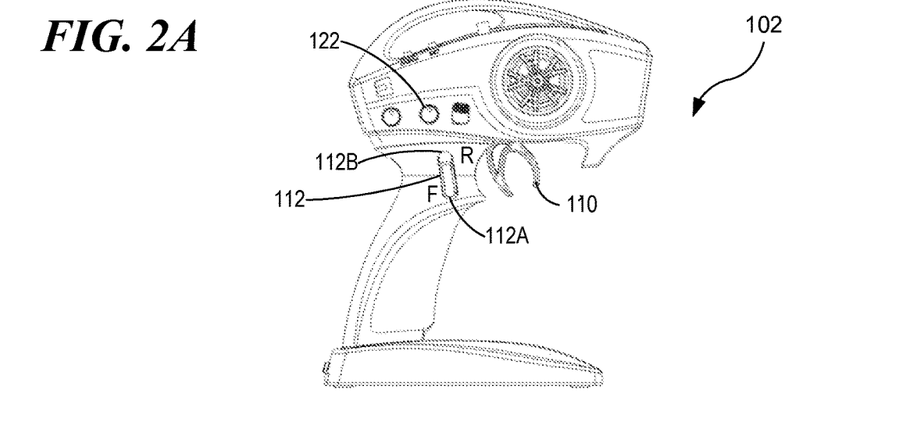
FIGS. 2A-2C depict a transmit controller in accordance with an exemplary embodiment of the present invention.
Figure 2B:
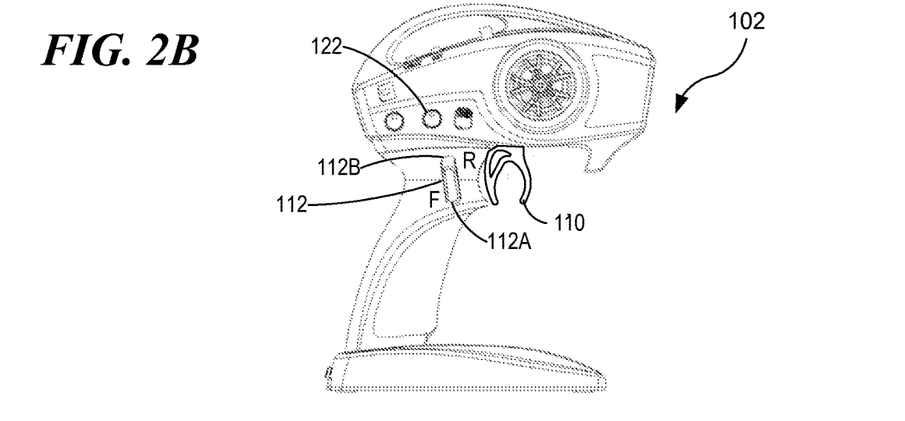
Figure 2C:
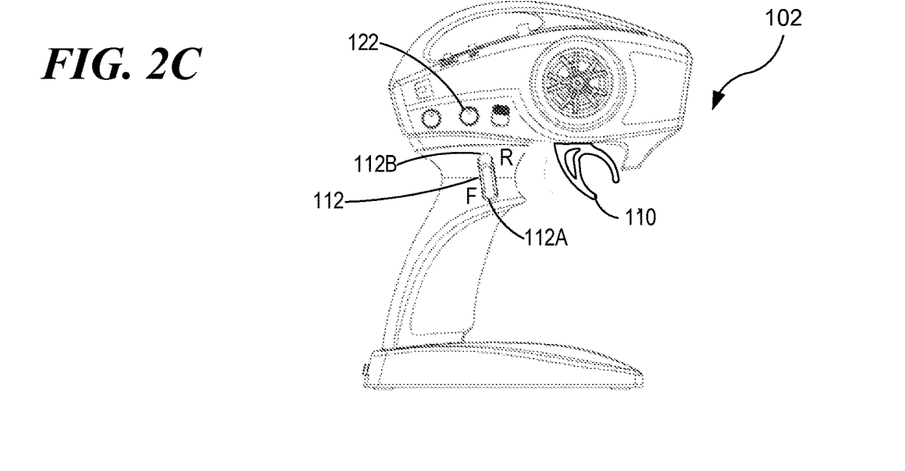

With reference to FIGS. 2A-2C, depicted is an exemplary transmit controller 102 shown with more detail. In each of FIGS. 2A-2C, brake bias user interface 122 is a dial. Direction switch 112 is in forward position 112A. In FIG. 2A, throttle trigger 110 is in neutral range 110B. In FIG. 2B, throttle trigger 110 is in acceleration range 110A. In FIG. 2C, throttle trigger 110 is in braking range 110C.

Figure 3:
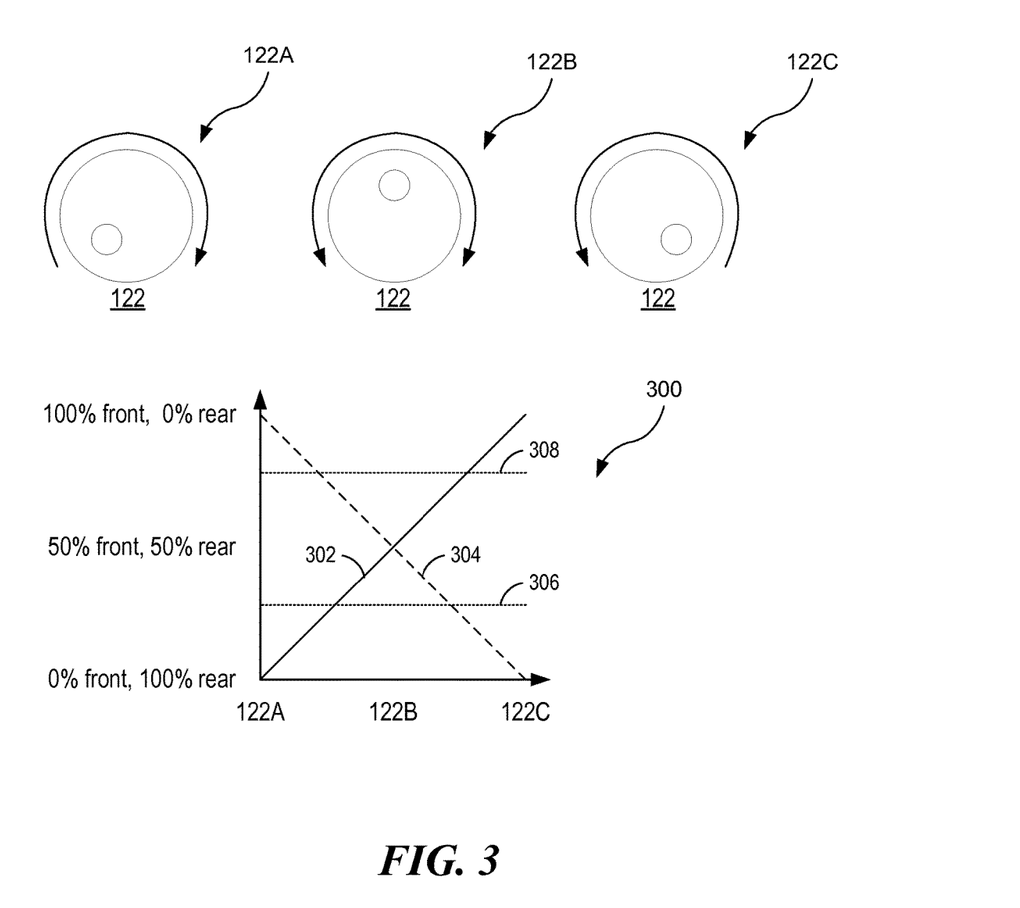
FIG. 3 depicts the operation of a brake bias user interface in accordance with an exemplary embodiment of the present invention.

With reference to FIG. 3, depicted is the operation of an exemplary brake bias user interface 122. In FIG. 3, brake bias user interface 122 is a dial. Brake bias user interface 122 has three positions 122A, 122B, and 122C illustrated. In position 122A, brake bias user interface 122 is rotated counterclockwise as much as possible. In position 122C, brake bias user interface 122 is rotated clockwise as much as possible. In position 122B, brake bias user interface 122 is halfway between positions 122A and 122C.

Graph 300 shows the relationship between the position of brake bias user interface 122, shown on the horizontal axis, and the resulting brake bias, shown on the vertical axis. In normal operation, the brake bias is shown by line 302. The brake bias changes from rear to forward as brake bias user interface 122 is turned from position 122A to position 122C. As mentioned above, in some embodiments the brake bias is reversed when the vehicle is set to accelerate in reverse. The resulting reversed brake bias is shown by line 304. The brake bias changes from forward to rear as brake bias user interface 122 is turned from position 122A to position 122C.

Also as mentioned above, the brake bias can also be set to a predetermined amount which favors the wheels in the direction the vehicle is moving. Line 306 shows the brake bias when set to a predetermined amount favoring the rear wheels. Line 308 shows the brake bias when set to a predetermined amount favoring the front wheels. When the brake bias is set to a predetermined amount, the position of brake bias user interface 122 is irrelevant.

Figure 4:
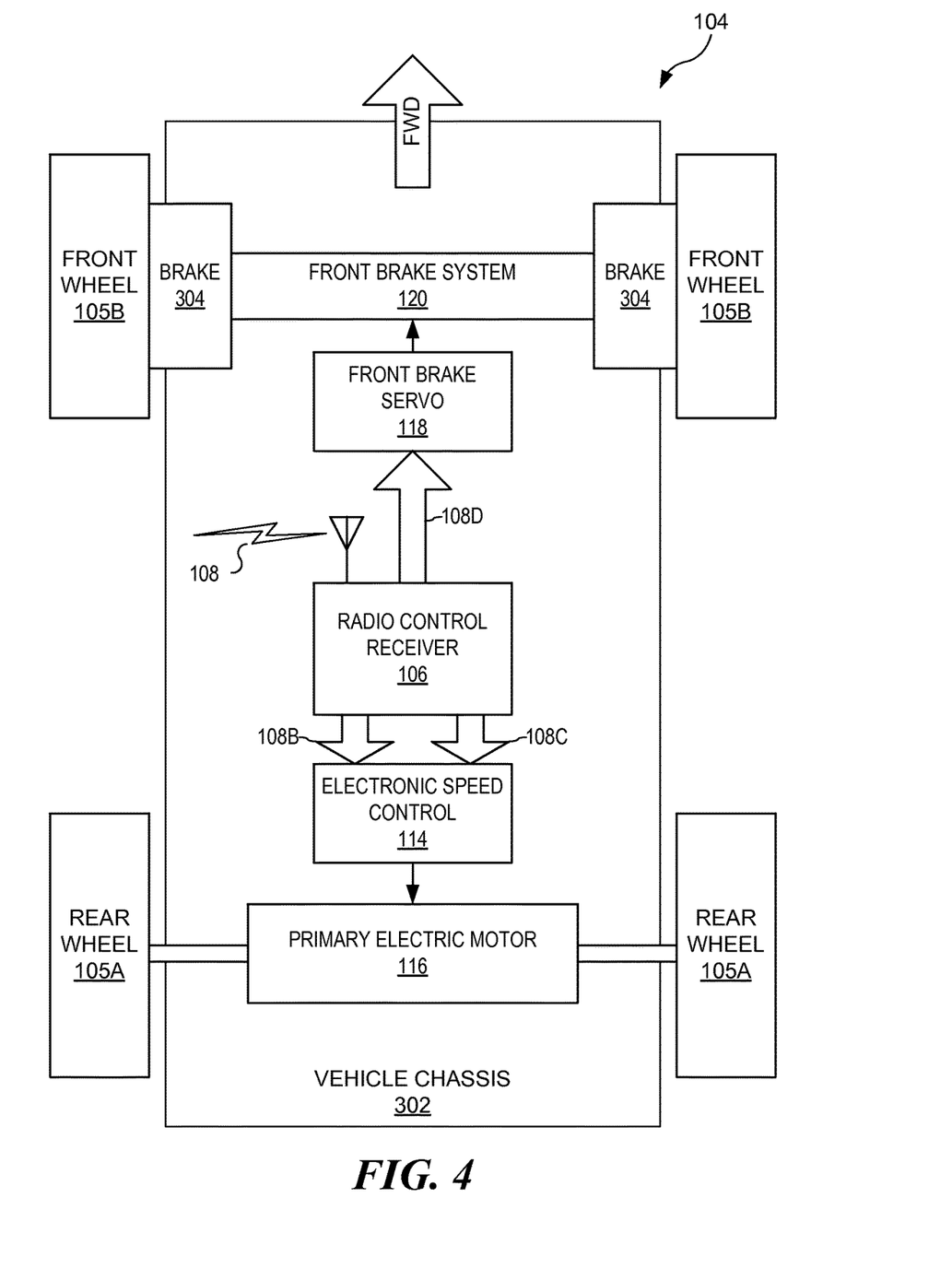
FIG. 4 depicts a rear-wheel drive model vehicle in accordance with an exemplary embodiment of the present invention.

Referring to FIG. 4, depicted is model vehicle 104 in more detail. Vehicle chassis 302 and brakes 304 are shown in addition to the parts of vehicle 104 shown in FIG. 1. Front brake system 120 includes brakes 304.

Figure 5:
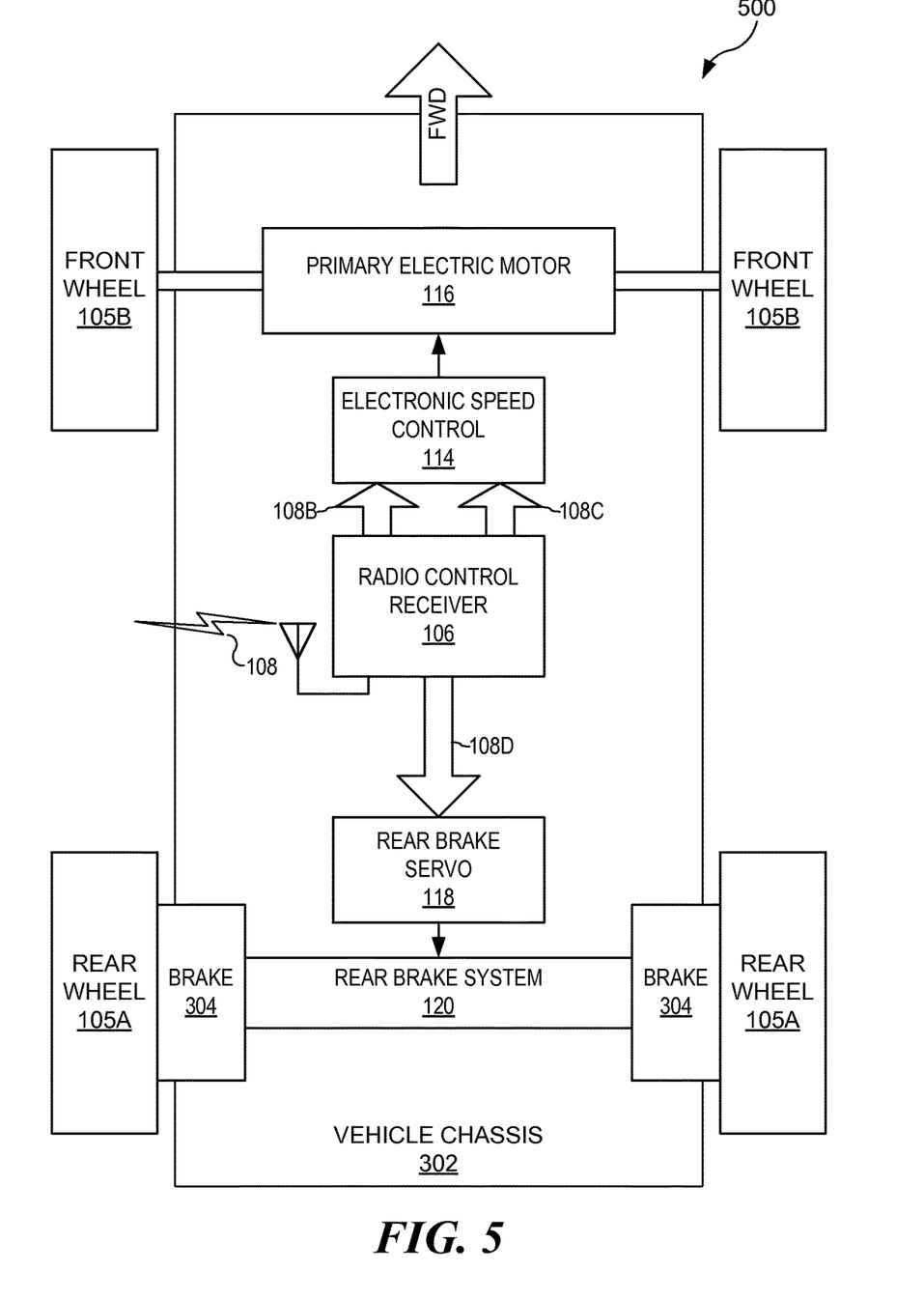
FIG. 5 depicts a front-wheel drive model vehicle in accordance with an exemplary embodiment of the present invention.

Referring to FIG. 5, depicted is an exemplary front-wheel drive vehicle 500. Front-wheel drive vehicle 500 is identical to model vehicle 104, but with parts rearranged for front-wheel drive. Primary electric motor 116 may drive and brake front wheels 105B conventionally as instructed by ESC 114. Front wheel brake servo 118 and front brake system 120 on vehicle 104 are rear wheel brake servo 118 and rear wheel brake system 120 on vehicle 500. Rear brake system 120 includes brakes 304. When instructed to by receiver 106, rear brake servo 118 may brake rear wheels 105A using rear brake system 120.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

We claim:

1. A model vehicle with a hybrid braking system comprising:
   one or more drive wheels;
   one or more non-drive wheels;
   an electric motor configured to drive and brake the drive wheels;
   a non-drive wheel brake system;
   a brake servo configured to apply the non-drive wheel brake system to the non-drive wheels;
   an electronic speed control controlling the electric motor; and
   a radio control receiver configured to:
      receive a first channel of information identifying an amount of acceleration or an amount of drive wheel braking force;
      provide the first channel of information to the electronic speed control;
      receive a second channel of information identifying an acceleration direction;
      provide the second channel of information to the electronic speed control;
      receive a third channel of information identifying an amount of non-drive wheel braking force; and provide the third channel of information to the brake servo.

2. The model vehicle of claim 1, wherein the radio control receiver is further configured to receive a fourth channel of information identifying an amount and direction of steering.

3. The model vehicle of claim 1, wherein the drive wheels comprise two rear wheels.

4. The model vehicle of claim 1, wherein the non-drive wheels comprise two front wheels.

5. The model vehicle of claim 1, wherein the drive wheels comprise two front wheels.

6. The model vehicle of claim 1, wherein the non-drive wheels comprise two rear wheels.

7. The model vehicle of claim 1, wherein the non-drive wheel brake system comprises a mechanical braking system.

8. The model vehicle of claim 1, wherein the non-drive wheel brake system comprises a hydraulic braking system.

9. A transmit controller for a model vehicle, the transmit controller comprising:
a throttle trigger capable of moving between a braking range and an acceleration range;
a brake bias user interface identifying an amount of brake bias; and
a transmit controller processor configured to:
when the throttle trigger is in the acceleration range, transmit an amount of acceleration over a radio link; and
when the throttle trigger is in the braking range:
determine an amount of braking force from the position of the throttle trigger;
divide, in accordance with the amount of brake bias, the amount of braking force into an amount of drive wheel braking force and an amount of non-drive wheel braking force; and
transmit the amount of drive wheel braking force and the amount of non-drive wheel braking force over the radio link.

10. The transmit controller of claim 9, further comprising a direction switch capable of moving between a forward position and a reverse position, and wherein the transmit controller processor is further configured to transmit an identification of the position of the direction switch over the radio link.

11. The transmit controller of claim 10, wherein the transmit controller processor is further configured to reverse the brake bias when the direction switch is moved between the forward position and the reverse position.

12. The transmit controller of claim 10, wherein the transmit controller processor is further configured to:
set the brake bias toward the front wheels when the direction switch is moved to the forward position; and
set the brake bias toward the rear wheels when the direction switch is moved to the reverse position.

13. A method of hybrid braking, comprising:
receiving, over a radio link, a first channel of information identifying an amount of drive wheel braking force;
applying the amount of drive wheel braking force to one or more drive wheels;
receiving, over the radio link, a second channel of information identifying an amount of non-drive wheel braking force; and
applying the amount of non-drive wheel braking force to one or more non-drive wheels.

14. The method of claim 13, wherein the applying the amount of drive wheel braking force to the one or more drive wheels comprises braking an electric motor.

15. The method of claim 13, wherein the applying the amount of non-drive wheel braking force to the one or more non-drive wheels comprises applying mechanical or hydraulic brakes.

16. The method of claim 13, wherein the one or more drive wheels comprise one or more rear wheels.

17. The method of claim 13, wherein the one or more non-drive wheels comprise one or more front wheels.

18. The method of claim 13, wherein the one or more drive wheels comprise one or more front wheels.

19. The method of claim 13, wherein the one or more non-drive wheels comprise one or more rear wheels.

20. A method of hybrid braking, comprising:
determining, from the position of a throttle trigger, an amount of braking force;
determining, from a brake bias user interface, an amount of brake bias;
dividing, in accordance with the amount of brake bias, the amount of braking force into an amount of drive wheel braking force and an amount of non-drive wheel braking force; and
transmitting the amount of drive wheel braking force and the amount of non-drive wheel braking force over a radio link.

21. The method of claim 20, further comprising:
determining, from a position of a direction switch, an acceleration direction; and
transmitting the acceleration direction over the radio link.

22. The method of claim 21, further comprising;
determining the position of the direction switch has changed; and
reversing the brake bias in response to the determining the position of the direction switch has changed.

23. The method of claim 21, wherein the acceleration direction is a forward acceleration direction, and further comprising setting the brake bias toward one or more front wheels in response to determining the forward acceleration direction.

24. The method of claim 21, wherein the acceleration direction is a reverse acceleration direction, and further comprising setting the brake bias toward one or more rear wheels in response to determining the reverse acceleration direction.

25. A method for improving the braking capabilities of a model vehicle, the model vehicle comprising one or more drive wheels and one or more non-drive wheels, the method comprising:
adding a non-drive wheel brake system to the model vehicle;
adding a brake servo to the model vehicle, the brake servo configured to apply the non-drive wheel brake system to the non-drive wheels of the model vehicle;
replacing an electronic speed control of the model vehicle with a replacement electronic speed control, the replacement electronic speed control configured to respond to a channel of information identifying an acceleration direction;
configuring a receiver of the model vehicle to provide the channel of information identifying an acceleration direction to the replacement electronic speed control; and
configuring the receiver of the model vehicle to provide to the brake servo a channel of information identifying an amount of non-drive wheel braking force.

* * * * *